S. L. BOGGS.
PROCESS OF MIXING MINERALS AND METALS WITH MOLTEN METAL.
APPLICATION FILED JULY 23, 1913.
1,083,724.
Patented Jan. 6, 1914.
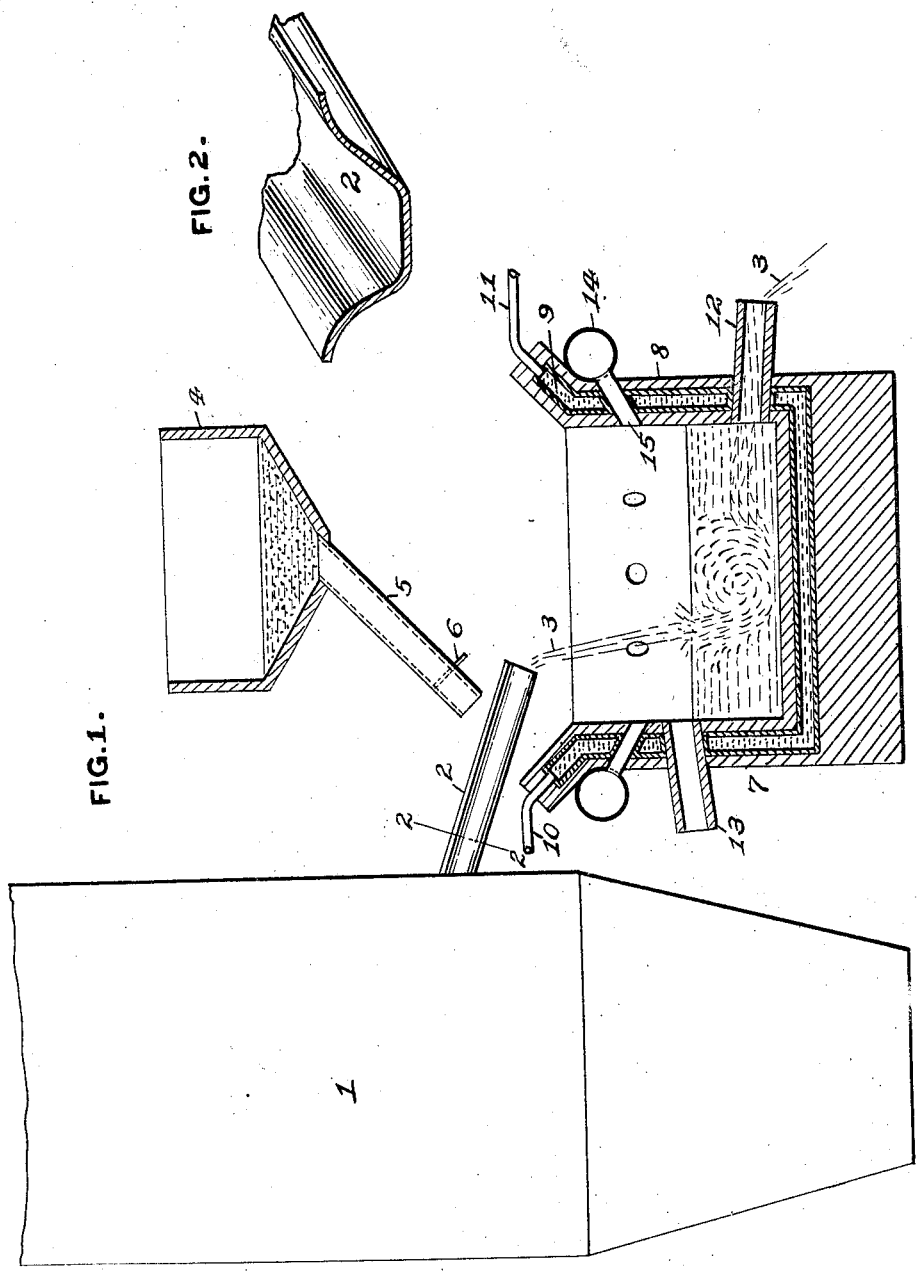
WITNESSES
INVENTOR
Samuel L. Boggs
By J. N. Cooke
Attorney.

UNITED STATES PATENT OFFICE.

SAMUEL L. BOGGS, OF PITTSBURGH, PENNSYLVANIA.

PROCESS OF MIXING MINERALS AND METALS WITH MOLTEN METAL.

1,083,724.  Specification of Letters Patent.  Patented Jan. 6, 1914.

Application filed July 23, 1913. Serial No. 780,689.

*To all whom it may concern:*

Be it known that I, SAMUEL L. BOGGS, a resident of Pittsburgh, in the county of Allegheny and State of Pennsylvania, and a citizen of the United States, have invented a new and useful Improvement in Processes of Mixing Minerals and Metals with Molten Metal; and I do hereby declare the following to be a full, clear, and exact description thereof.

My invention relates to the mixing of minerals and metals with molten metal and more particularly to the mixing and utilization of blast furnace, smelter and other flue dusts, also metals and minerals whereby they are introduced into the extreme hot molten metal in the spout of a blast or other furnace as it leaves the same so that the flue dust, metal or mineral will adhere to the hot molten metal and thus be conveyed in and around a mixing chamber or ladle by gravity, the air blast and the action of the heat so that it is immersed and absorbed by the molten metal in the mixing chamber or ladle and will form a homogeneous mixture or mass with the metal in said chamber. The finished metal is removed from the furnace by a spout while the slag is removed from another spout.

The process combines blast furnace, smelter and other flue dusts, also metals and minerals, with the metal or mineral in a furnace spout outside of the furnace so that they may be run into a mixing chamber or ladle and the mixture made and at the same operation the slag removed.

The object of my invention is to provide a cheap, simple and efficient process and apparatus for mixing and utilizing blast furnace, smelter and other flue dusts, and also mixing metals or minerals with metal by the utilization of its own heat after it leaves the furnace.

My invention consists, generally stated, in the novel process arrangement, construction and combination of parts as hereinafter more specifically set forth and described and particularly pointed out in the claim.

To enable others skilled in the art to which my invention appertains to use my apparatus and practise my improved process I will describe the same more fully referring to the accompanying drawing in which:—

Figure 1 is a side elevation, partly in section, of an apparatus employed for carrying out my improved process. Fig. 2 is a perspective cross-sectional view of the furnace spout on the line 2—2, Fig. 1.

Like symbols of reference herein indicate like parts in each of the figures of the drawing.

It is a well known fact that a large percentage of the ore deposited in blast and other furnaces passes from the same in the form of dust which when recovered represents a very great amount of the finished metal so that numerous devices and processes have been devised for utilizing these waste dusts such, for instance, as briqueting but this process requires the resmelting of the dust and which by my improved process is eliminated.

As illustrated in the drawing my improved process and apparatus are shown in connection with a blast furnace but can be used with other furnaces as desired. The blast furnace 1 is provided with the usual spout 2 for emptying said furnace of the liquid metal 3 and such spout is open at its upper side as shown in Fig. 2. Located above the spout 2 is a tank 4 which is used for holding ore dust, metals or minerals, and such tank is provided with an outlet pipe 5 at its lower end for permitting the dust, metals or minerals to pass from the same as hereinafter described. This pipe 5 is provided with a gate valve 6 at any suitable position within the length of the same while the lower end of such pipe is so placed as to deposit the dust, metals or minerals in the spout 2 of the furnace 1.

At the side of the furnace 1 is a mixing vessel 7 which is open at its upper end and formed of the usual brick construction used in this class of work. The wall 8 of the mixing vessel 7 is provided with water jackets 9 which have the usual inlet and out pipe 10 and 11 respectively for the water while at a point near the lower end of such vessel is a spout 12 for allowing molten metal to flow therefrom as later explained. This vessel 7 is further provided with an opening 13 located above the spout 12 for the purpose of withdrawing from the surface of the molten metal 3 any slag which might accumulate thereon. Around the mixing vessel 7 is a bustle pipe 14 which communicates with any suitable supply of blast and such pipe is adapted to also communicate with a number of twyers 15 in the wall 8 of the said vessel in order to supply blast to the same as later explained.

The operation and process of my invention is as follows:—When the metal in the furnace 1 is reduced to a liquid mass and is ready to be taken from said furnace the same is allowed to flow from the spout 2 into the mixing vessel 7 while at the same time the gate valve 6 is opened so that the dust, metal or mineral in the tank 4 is allowed to flow through the pipe 5 and onto the molten metal 3 in the spout 2. If desired a sprayer or spreader may be placed at the end of the pipe 5 to prevent the dust, metal or mineral from entering the spout 2 in any compact mass. As the liquid or molten metal 3 thus passes from the spout 2 into the mixing vessel 7 it will fall and penetrate the surface of the metal already in such vessel so as to keep up a good circulation therein and thus combine the ore dust, etc., with the liquid material. The blast entering the vessel 7 will also tend to maintain the temperature of the molten metal besides assisting materially in the confusion or mixing of the metal and dust in said vessel. The molten metal will be drawn from the spout 12 in precisely the same amounts as the metal entering the vessel from the spout 2 so that there will always be a uniform height of metal in the vessel while the spout 2 is delivering the molten metal from the furnace 1.

It will also be seen that my improved process can be carried on by allowing the molten metal to flow from a ladle or other container in precisely the same manner as it flows from the spout of the furnace.

It will thus be seen that with the use of my improved process and apparatus the ore dust, metals or minerals can be introduced into the liquid metal while the same is flowing from the furnace provided enough mixing can be produced to scatter the same thoroughly through the molten mass. This is accomplished by the fall of the molten metal into the vessel and may be assisted by the action of the blast.

What I claim as my invention and desire to secure by Letters Patent is:—

The process of mixing flue dust or other fines with molten metal, comprising the steps of first introducing the dust into the molten metal as it leaves the furnace spout and flows into a vessel where its inertia mixes the whole together, and then introducing blast to the molten metal in said vessel to assist in the mixing and to maintain the required temperature.

In testimony whereof, I the said SAMUEL L. BOGGS, have hereunto set my hand.

SAMUEL L. BOGGS.

Witnesses:
M. V. PEARSON,
T. B. HUMPHRIES.